US010613514B2

(12) United States Patent
Bollendorf

(10) Patent No.: US 10,613,514 B2
(45) Date of Patent: *Apr. 7, 2020

(54) FABRICATION AND TRACKING

(71) Applicant: Greenlee Tools, Inc., Rockford, IL (US)

(72) Inventor: Kevin Bollendorf, Janesville, WI (US)

(73) Assignee: Greenlee Tools, Inc., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,895

(22) Filed: Dec. 22, 2017

(65) Prior Publication Data

US 2019/0004495 A1    Jan. 3, 2019

Related U.S. Application Data

(63) Continuation of application No. 15/049,288, filed on Feb. 22, 2016, now Pat. No. 9,886,024, which is a continuation of application No. 14/508,252, filed on Oct. 7, 2014, now Pat. No. 9,298,180, which is a continuation of application No. 13/479,818, filed on May 24, 2012, now Pat. No. 8,886,348.

(60) Provisional application No. 61/489,753, filed on May 25, 2011.

(51) Int. Cl.
| | |
|---|---|
| G05B 19/4097 | (2006.01) |
| G06F 17/50 | (2006.01) |
| G06Q 10/06 | (2012.01) |
| G06Q 10/08 | (2012.01) |
| G06Q 20/10 | (2012.01) |

(52) U.S. Cl.
CPC ......... *G05B 19/4097* (2013.01); *G06F 17/50* (2013.01); *G06F 17/5004* (2013.01); *G06Q 10/06* (2013.01); *G06Q 10/063114* (2013.01); *G06Q 10/0833* (2013.01); *G06Q 20/102* (2013.01); *G05B 2219/23005* (2013.01)

(58) Field of Classification Search
CPC ............ G05B 19/418; G05B 19/41815; G05B 19/4181; G06Q 10/06; G06Q 10/063114; G06Q 10/06316; G06Q 10/0633
See application file for complete search history.

(56) References Cited

U.S. PATENT DOCUMENTS

| | | |
|---|---|---|
| 3,145,756 A | 8/1964 | Hill |
| 3,653,251 A | 4/1972 | Coonan |
| 3,927,948 A | 12/1975 | Cox et al. |

(Continued)

FOREIGN PATENT DOCUMENTS

WO    WO-9113706 A1    9/1991

OTHER PUBLICATIONS

AutoCAD MEP Software Overview, copyright 2014. Accessed on the Internet Mar. 31, 2014. URL:<http://www.autodesk.com/products/autodesk-autocad-mep/overview> (2 pages).

(Continued)

*Primary Examiner* — Christopher E. Everett
(74) *Attorney, Agent, or Firm* — Schwegman Lundberg & Woessner, P.A.

(57) ABSTRACT

A method of fabrication for a component to be installed in a facility, the facility being represented by an electronic design model, the method including extracting, at a computing device and from the model, details of the component and controlling a plurality of stations with the computing device to fabricate and track the component.

21 Claims, 5 Drawing Sheets

(56) References Cited

U.S. PATENT DOCUMENTS

| | | | |
|---|---|---|---|
| 5,315,522 | A | 5/1994 | Kauffman et al. |
| 5,587,914 | A | 12/1996 | Conradson et al. |
| 5,768,149 | A | 6/1998 | Umney et al. |
| 5,936,863 | A | 8/1999 | Kostelnik et al. |
| 5,969,973 | A | 10/1999 | Bourne et al. |
| 6,272,447 | B1 | 8/2001 | Gavin et al. |
| 6,757,576 | B2 | 6/2004 | Greer et al. |
| 6,757,643 | B2 | 6/2004 | Gavin et al. |
| 6,778,871 | B2 | 8/2004 | Holman et al. |
| 7,305,274 | B2 | 12/2007 | Greer et al. |
| 7,349,863 | B1 | 3/2008 | Pena-Mora et al. |
| 7,752,065 | B2 | 7/2010 | Buzz |
| 8,099,260 | B2 | 1/2012 | Kfouri et al. |
| 8,150,660 | B2 | 4/2012 | Reghetti et al. |
| 8,224,628 | B2 | 7/2012 | Reghetti et al. |
| 8,315,840 | B2 | 11/2012 | Mangon |
| 8,482,558 | B2 | 7/2013 | Morello et al. |
| 2002/0007605 | A1 | 1/2002 | Cohen et al. |
| 2002/0010522 | A1 | 1/2002 | Martin |
| 2002/0099460 | A1 | 7/2002 | Bowler et al. |
| 2002/0183983 | A1 | 12/2002 | Ehrlich et al. |
| 2004/0073410 | A1 | 4/2004 | Maly et al. |
| 2004/0083017 | A1 | 4/2004 | Brown et al. |
| 2004/0138772 | A1 | 7/2004 | Barman et al. |
| 2004/0186697 | A1 | 9/2004 | Schreier et al. |
| 2004/0225391 | A1 | 11/2004 | Fromherz et al. |
| 2004/0255266 | A1 | 12/2004 | Dement |
| 2005/0171790 | A1 | 8/2005 | Blackmon |
| 2006/0075718 | A1 | 4/2006 | Borne et al. |
| 2006/0271480 | A1 | 11/2006 | Allin et al. |
| 2007/0255656 | A1 | 11/2007 | Olson et al. |
| 2008/0021823 | A1 | 1/2008 | Allin et al. |
| 2009/0012886 | A1 | 1/2009 | Allin et al. |

OTHER PUBLICATIONS

CAD Duct Product Brochure. Accessed on the Internet Mar. 31, 2014. URL:<http://www.google.com/url?sa=t&rct=j&q=&esrc=s&frm=1&source=web&cd=5&ved=0CFoQFjAE&url=http%3A%2F%2Fwww.intercadsys.com%2Fimages%2FCAD%2520DUCT%2520Brochure.pdf&ei=Lnk5U-vUM_LJsATYilGADA&usg=AFQjCNEqpgCcAlt6DeMV-6hkFk90TCLBVQ&bvm=bv.63808443,d.cWc> (8 pages).

CAD Pipe Homepage. Accessed on the Internet Mar. 31, 2014. URL:<http://www.cadpipe.com> (2 pages).

Hart, George V. et al., edited by William C. Buchanan,"Ugly's Electrical References, Revised 1999 Edition", copyright 1978 (pp. 130-139).

Navisworks Software Overview, copyright 2014. Accessed on the Internet Mar. 31, 2014. URL:<http://www.autodesk.com/products/autodesk-navisworks-family/overview> (2 pages).

Revit Building Design Software Overview, copyright 2014. Accessed on the Internet Mar. 31, 2014. URL:<http://www.autodesk.com/products/autodesk-revit-family/overview> (2 pages).

Strano, M. "Automatic tooling design for rotary draw bending of tubes", Int. J. Adv. Manuf. Technol., vol. 26, pp. 733-740, 2005.

Van Der Velden, C. et al. "An intelligent system for automatic layout routing in aerospace design", Innovations Syst. Softw. Eng., vol. 3, pp. 117-128, 2007.

Harvey, Jim, "Bend-Tech Pro Tube Bending Software [Video]", [Online]. Retrieved from the Internet: <https://www.youtube.com/watch?v=dt_1WbdlCUM>, (Published on Apr. 29, 2011), 13:47.

FABRICATION AND TRACKING

CROSS-REFERENCE TO RELATED APPLICATIONS

This application is a continuation of U.S. patent application Ser. No. 15/049,288, filed on Feb. 22, 2016 and issued on Feb. 6, 2018 as U.S. Pat. No. 9,886,024, which is a continuation of U.S. patent application Ser. No. 14/508,252, filed on Oct. 7, 2014 and issued on Mar. 29, 2016 as U.S. Pat. No. 9,298,180, which is a continuation of U.S. patent application Ser. No. 13/479,818, filed on May 24, 2012 and issued on Nov. 11, 2014 as U.S. Pat. No. 8,886,348, which claims the benefit of priority to U.S. Provisional Application Ser. No. 61/489,753, filed on May 25, 2011, the contents of each of which are hereby incorporated by reference herein, in their entireties.

FIELD

The present description relates generally to devices and processes for streamlining the construction process. More particularly, this description relates to automating an otherwise fragmented process of design, fabrication, delivery, and installation for a construction project. Still more particularly, this application relates to devices and processes for interpreting a design for a project, controlling and monitoring forming and/or fabrication of the components or parts of the design, monitoring and/or tracking the delivery and installation of the parts in the project, and comparing the installation to the design.

BACKGROUND

The construction of a building, for example, involves several different parties who are all involved in a coordinated effort to construct the building. On the front end or design portion of a project, the parties involved may include an architect, a structural engineer, a mechanical engineer, an electrical engineer, and often an information technology consultant or engineer. In a design-build project, a construction manager and/or one or more contractors may also be involved in the front end or design portion of the project. During construction of the project, a general contractor or construction manager may manage the project and several sub-contractors having particular expertise may construct particular aspects of the building. For example, a structural steel contractor may erect the steel structure, a mechanical or heating, ventilation, and air conditioning contractor may install these respective systems, and an electrical contractor may install the electrical components of a building.

The several parties involved during the construction of the project may read, study, or otherwise interpret the design prepared on the front end of a project. This generally includes reading plans and specifications and often preparing shop drawings for fabrication of the party's respective portions of the project. The shop drawings may then be reviewed by the designing entity and, once approved, used by a fabrication facility to fabricate the several components of the party's portion of the project. The several components may then be shipped to the project site and installed.

As the several parties involved during construction coordinate their efforts, a contractor or other construction manager often monitors their work for purposes of coordinating and scheduling the several aspects of the project. In addition, the work may be monitored for purposes of progress payments. That is, contractors are often paid based on their percent completion. It is common for percent completion to be relatively cursorily developed. That is, the general contractor may ask the electrical contractor how far they are and the electrical contractor may roughly estimate that they are 30% complete, for example. The general contractor may then make a payment to the electrical contractor in an amount approximately equal to 30% of the electrical contract amount.

SUMMARY

In one embodiment, a method of fabrication for a component to be installed in a facility is provided. The facility may be represented by an electronic design model. The method may include extracting, at a computing device and from the model, details of the component. The method may also include controlling a plurality of stations with the computing device to fabricate and track the component.

In another embodiment, a method of fabrication may include extracting, at a computing device and from an electronic design model of a facility, details of a component for installation in the facility. The method may also include controlling a component configuration device to fabricate the component.

In another embodiment, a method of monitoring percentage completion of a facility may include receiving, at a computing device, data including an indication of status of installation of a component in the facility. The method may also include comparing the data to a model including all of the components of the facility and calculating a percentage completion based on the comparison.

In still another embodiment, a system for fabrication for a component to be installed in a facility may be provided. The facility may be represented by an electronic design model and the system may include a computing device having a plurality of modules associated therewith. The module may include an interpretation module including computer implemented instructions for extracting details of the component, an identifying module including computer implemented instructions for associating an identifier with the component, and a component configuration module including computer implemented instructions for shaping the component.

In yet another embodiment, a system for fabrication may include a computing device having computer implemented instructions for performing operations. The operations may include extracting, from an electronic design model of a facility, details of a component for installation in the facility and controlling a component configuration device to fabricate the component.

In still another embodiment, a system for monitoring percentage completion of a facility may include a computing device having computer-implemented instructions stored thereon for performing operations. The operations may include receiving data including an indication of status of installation of a component in the facility, comparing the data to a model including all of the components of the facility, and calculating a percentage completion based on the comparison.

In yet another embodiment, a method of extracting data from an electronic model of a facility may include selecting a facility system to extract, accessing, with a computing device, a data file for the system having coordinate data relating to a component of the system, reading and storing the coordinate data of the component, accessing, with a computing device, a data file for the system having attribute data relating to the component, reading and storing the attribute data, and associating the attribute data with the coordinate data.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The present description relates to mining data from a model and using the data to construct several parts reflected by the model. The present description further relates to identification of the several parts, tracking of the delivery of the several parts, and tracking of the installation of the several parts. Still further, the description includes discussion of comparing the installed parts to the model at least for determining a percent complete.

In one embodiment, a system is provided for mining data from a Building Information Model (BIM). The system may be adapted particularly for the electrical contracting industry and may mine data from the BIM model relating to the electrical systems of a building, for example. The system may thus interpret the BIM model and develop shop detail-level instructions for fabrication of the parts of the electrical system. The system may include a control system and several devices. For example, the system may include devices for picking the raw materials for the parts and identifying the parts as part of an assembly. The system may further include fabrication machines such as benders, cutters, or other devices used for preparing a part for installation. Bundling or otherwise grouping the several parts may also be conducted by the system.

Once fabricated or otherwise ready for installation, the parts may be shipped to a project site and installed. Throughout these later processes, the system may be equipped with a tracking module for tracking the status of the several parts. The tracking information may be transmitted or sent back to the system for comparison to the BIM model. The system may compare the installed parts to the BIM model and determine an accurate percent completion.

Figure 1:
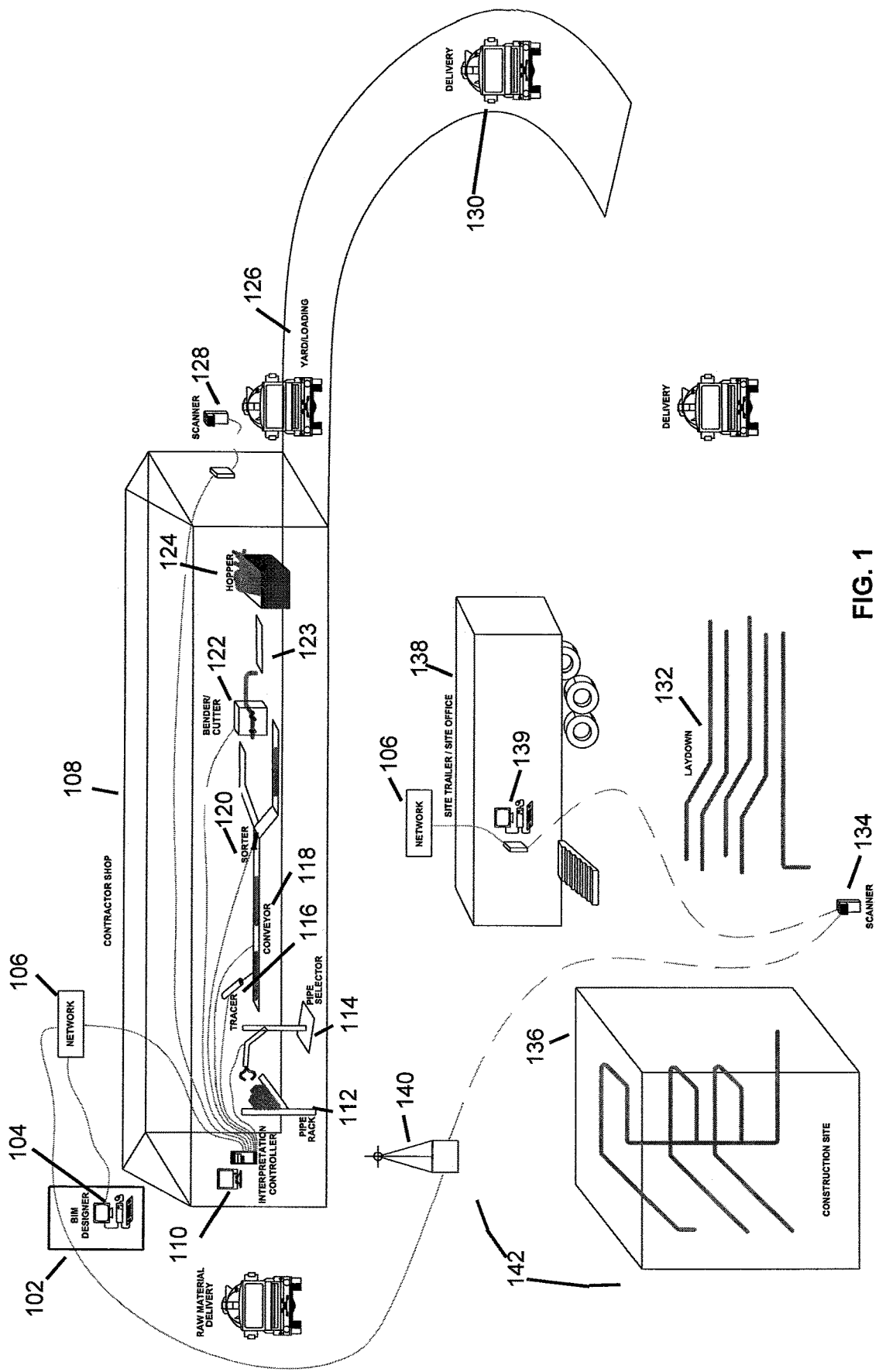
FIG. 1 is a schematic diagram of a system according to some embodiments.

Referring now to FIG. 1, a diagram is shown including several devices and systems 100 for implementing the method. The diagram includes a depiction of a design facility 102, a pre-assembly facility 108, and a project site 142. In the design facility 102, for example, engineers, designers, and/or contractors may design a project and prepare specifications. In the pre-assembly facility 108, a contractor, for example, may prepare particular components for portions of the design. The components may be delivered to project site where they may be installed. Each of these locations 102, 108 may have systems and devices for performing a portion of the method to be described and systems and devices may be fully or partially coordinated.

The engineering facility 102 may include design related devices and systems. In one embodiment, the engineering facility 102 may include a modeling system 201 where the designing entity may input data relating to a particular design aspect of a to-be-constructed building or other facility. For example, a structural engineer may input column locations and sizes and beam locations and sizes. An electrical engineer and/or contractor, at the same or separate design facility 102, may enter conduit sizes and locations. The model 201 may be used by the several designing entities to compare each of their respective designs and highlight conflicting areas where, for example, portions of the electrical design cross-over or run into portions of the structural design. Other conflicts that raise concerns regarding the constructability of the layouts may also be addressed using the model 201. As such the designing entities may include most or even all of the elements of their design in the model 201 to be sure no particular element conflicts with any element or elements of any other designing entities design. In some embodiments, the model used by the several designing entities may be a building information modeling system (BIM). Some examples of software used for this modeling include REVIT, AutoCAD MEP, CAD Duct, CAD Pipe, Navisworks manage, and others. Still other software packages for modeling a facility may also be used.

The pre-assembly facility 108 may be configured to interpret the designing entity's design and provide particular components to implement the design. In some embodiments, as will be described in more detail below, the pre-assembly facility 108 may access the model 201 prepared by the designing entity or entities and mine data from the model 201 to develop the components for constructing a particular portion of the design. Accordingly, the pre-assembly facility 108 may include a computing device 110 connected to a network 106 for accessing the BIM model 201 of the designing entity. The network 106 may be a wide area network such as the Internet, for example, or a local area network may be provided. The computing device 110 may include one or more inputs, one or more outputs, a computer readable storage medium, and a processor. The computing device 110 may also include a user interface including a computer screen, mouse, keyboard, and the like, each connected to an input for providing user instructions to the processor. The computer readable storage medium may include computer implemented instructions and/or software including steps or operations or sets of steps or operations for performing the methods described herein.

In conjunction with the performance of the methods described herein, the computing device may have a plurality of modules stored therein for interacting with other devices of the system and coordinating and/or controlling portions of the method. For example, an interpretation module may include computer implemented instructions for interpreting the design model 201 and developing a list, table, or other index of the components for a project including details for the fabrication of the components. Another example may include a selection module including computer implemented instructions for controlling the devices used to select the raw materials. Still other examples of modules may include an identification module, a sorting module, a conveyor module, a cutting module, a bending module, a bin/yard module, a delivery module, a site module, an installation module, and a comparison module.

Each of the above-listed modules or other modules may include software, hardware, or a combination of software or hardware configured with computer implemented instructions for performing the respective operations of the method to be described below. The modules may be stored on the computer readable storage medium of the computing device 110 or some portions or the whole of the module may be stored on the respective device performing the respective portion of the method. In addition, combinations of all or a portion of the several modules may be used to perform one or more of the operations described in the method.

An initial step in providing particular components of the design may include selecting suitable raw materials. In the case of electrical conduit, this may include selecting a suitable pipe size and pipe type, for example. Accordingly, the pre-assembly facility 108 may include a raw material picking device 114. In the case of electrical conduit the device may be a pipe selector 114 and the device may be adapted to select a pipe from a rack 112 having a variety of pipe types and sizes stored thereon. In some embodiments, as shown, the pipe selector 114 may have one or more graspers for grasping and handling the pipe. The pipe selector 114 may include an arm with the graspers positioned thereon and the arm may be pivotable relative to a support and/or the support may be rotatable. Once selected, the pipe selector 114 may remove a pipe from a rack, for example, and send the pipe down a conveyor 118 for further processing and/or fabrication. In other embodiments, the raw material picking device 114 may include a series of gates arranged on the pipe rack 112 where opening of a selected gate may allow a selected pipe to roll off of the pipe rack 112, for example. Other material handling devices for picking raw materials may also be provided.

The pre-assembly facility 108 may include a conveyor 118 for moving the components of a project through the facility. The conveyor 118 may include one or a series of conveyors 118 arranged to deliver the components to each of the stations of the pre-assembly process. The conveyor 118 may be a belt-type conveyor, a picking device movable along a rail with a trolley, for example, or some other material handling system. The conveyor 118 be arranged between or along each of the stations in the pre-assembly facility 108.

At some point in the pre-assembly process, the particular components of the design may be marked, tagged, or otherwise labeled with an identifier. The identifier may include a sticker, an etching, a printed mark, a QR code, or some other identifier associated with a particular component for identifying the component throughout the process. Accordingly, the pre-assembly facility 108 may include an identification device 116 for providing the identifier. The identification device 116 may include a labeler, a laser writer, an etching device, an ink printing device, or some other system for providing an identifier. The identification device 116 may be in communication with the computing device and the identifiers may be particularly adapted for association with properties for fabricating the component. For example, an identifier may be associated with dimensional data such as the diameter and length of the pipe and information about one or more bends in the pipe. Other fabrication information may also be associated with the identifier.

The pre-assembly facility 108 may also include a series of readers 119 throughout the facility arranged to read the identifiers and relay the information to respective systems for suitably handling the respective components. For example, the readers 119 may be arranged along the conveyor 118 and, in one embodiment, a reader 119 may be associated with a sorter 120. The reader 119 may be adapted to read the identifier on a passing component and control the sorter 120 such that the component is directed according to its fabrication properties. For example, the sorter 120 may be configured for directing straight pipes in one direction and directing pipes needing to be bent in another direction. The associated reader 119 may read the identifier and provide the identity to the computing device 110, which may, in turn, control the sorter 120 to suitably direct the component through the process. One or more sorters 120 may be provided throughout the process depending on the complexity of the components being fabricated. For example, an additional sorter 120 may be provided to suitably direct pipes needing to be bent. That is, in some cases, a pipe bend may be performed by equipment and in other cases, a pipe bend may occur manually. The sorter 120 at this location may be configured via the sorter module to direct pipes capable of being bent by the equipment to the pipe bender and directing other pipes to a manual station, for example.

The pre-assembly facility 108 may also include component configuration equipment 122. The component configuration equipment 122 may include devices configured for forming, shaping, or otherwise configuring the component to fit within the design. In one embodiment, the component configuration equipment 122 may include a bender, cutter, press, or other device for configuring the component as a whole. This device may be in the form of a CNC machine or other device used to form the component. As with some or all of devices of the system, the component configuration equipment 122 may be in communication with the computing device 110 for receiving fabrication instructions.

The pre-assembly facility 108 may also include component finishing equipment 123. The component finishing equipment 123 may include devices configured for finishing the equipment. For example, this may include drilling holes, performing edge preparations, providing protective coatings, threading holes or ends of pipes, or otherwise detailing the component for installation.

Still further, the pre-assembly facility 108 may include sub-assembly equipment for creating sub-assemblies out of one or more components. For example, where a series of pipes are connected together by coupling or elbows or other connectors, the a series of pipes may be connected in the shop to save time assembling the parts in the field. The sub-assembly equipment or station may thread a connector onto the end of a first pipe, for example, and may thread a second pipe onto the connector, and so on. The sub-assemblies may be provided by sub-assembly equipment where, for example, a series of components connected together remains reasonably handleable and shippable.

The pre-assembly facility 108 may also include a collector 124. The collector 124 may be configured for gathering the several components of the design as the components come through the pre-assembly facility 108. That is, several of the components of a design may be diverted through differing processes on their way to the collector 124. For example, straight pipes may go more or less directly to the collector 124 after leaving the selection 114 and identifying 116 stations. In contrast, a bent pipe may go through a pipe bending process before being directed to the collector 124. The collector 124 may read the identifiers on the components coming through the system and gather or group related components. The collector 124 may place the several components in a bin, for example. For a particular pipe run, for example, the collector 124 may collect all pipe components having related identifiers and the collector may group and bundle the related pipes for shipping as a unit to the project site. In some embodiments, the collector 124 may affix a label or other identifier to a bin having components placed therein where the label may provide an indication of what components are in the bin.

The pre-assembly facility 108 may also include a yard 126 for storage of materials waiting to be delivered to the project site. The yard 126 may be a place where individual components or bins of components are stored prior to shipping to the project site. The yard 126 may include a scanner 128 or other input device for scanning bins or individual components as the bins or components enter and/or leave the yard 126. The scanner 128 may thus be in the form of a reader 119. The scanner 128 may be a laser-type reader, an infrared-type reader, an imaging-based scanner or other device for reading information from a label, stamp, or other identifier. In some embodiments, the scanner 128 may be akin to a digital camera and the identifier on the components or the bin may be in the nature of a QR code or other two dimensional code. The scanner 128 may be used to scan the code and transmit the data to the computing device 110. As such, the scanner 128 may include a wired or wireless connection to the computing device 110 or to a closer hub for relaying to the computing device 110 such that the materials for a project can be tracked. The scanner 128 may include a setting or series of settings allowing the scanner 128 to be set to reflect a certain stage of the process. For example, the scanner 128 may have a switch for setting the scanner 128 to indicate that an item has shipped or has been loaded when an item is scanned. Other settings may include that the item or component has been loaded into a bin or placed in the yard 126, for example.

An additional scanner 134 may be provided at the construction site for tracking the components at the site. The scanner 134 may be the same or similar to the scanner 128 or the readers 119 used at or near the pre-assembly facility 108. That is, the scanner 134 may be configured for reading the labels or identifiers on the components or on the bins and may include one or more settings for indicating the stage of the scanned component or item. As with the scanner 128 at the pre-assembly facility 108, the scanner 134 may include settings allowing for an indication of the particular stage of the process the scanned component is in. The scanner 134, for example, may be set to indicate that a component or series of components has been delivered to the job site, is in a lay down area, or is installed in the building, for example. The scanner 134 at the construction site may be equipped with broad range wireless communication technology and may be configured for transmitting information from the scanner 134 back to the computing device at the pre-assembly facility 108 via wireless communication 140. In other embodiments, the scanner 134 may equipped with closer range technology in the form or wired or wireless technology that may transmit information to a hub 139 in a job trailer 138, for example, where the information may be relayed to the computing device 110 either wirelessly or via a network 106. In some embodiments, the scanner 134 at the site may be interchangeable with the scanner 128 at the pre-assembly facility 108. In other embodiments, all of the readers 119 or scanners 128, 134 described may be interchangeable with one another.

Figure 2:
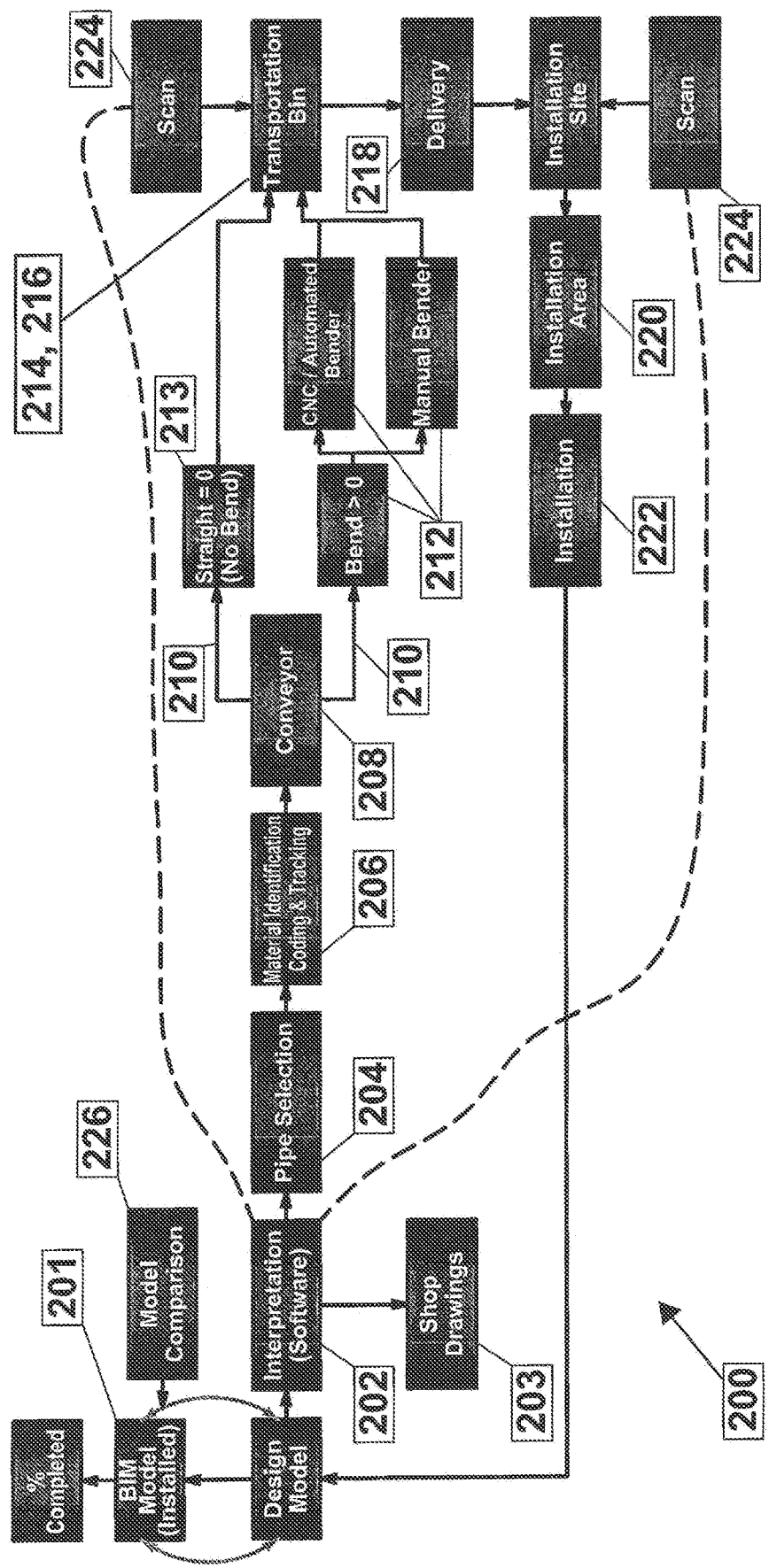
FIG. 2 is a flow chart of a method performable by all or a portion the system of FIG. 1.
Figure 3:
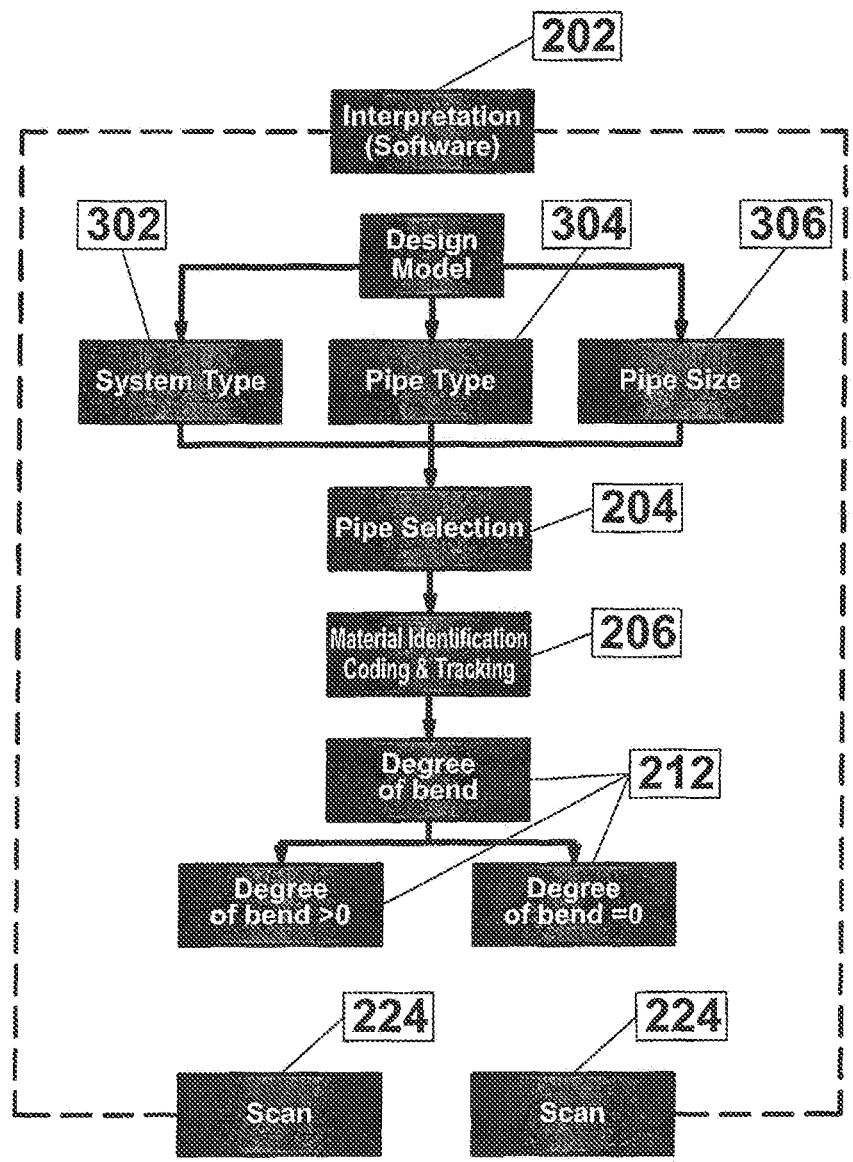
FIG. 3 is a flow chart of a portion of the method of FIG. 2 showing a detailed view of a portion thereof.

Turning now to the method 200 of component processing, reference is made to FIGS. 2 and 3. As shown in FIG. 2, a method (200) of interpreting, fabricating, tracking, and comparing is shown. As shown, the method may include interpreting (202) a model and extracting data from the model to develop a list, table, or other index of components for use in constructing a facility. The method may also include several fabricating steps including selecting a raw material (204) for fabrication of a component and providing an identifier (206) on the component for use in routing and tracking the component. Other fabricating steps may include conveying (208) the component through the fabrication facility, sorting (210) between components needing further fabrication and those that may not, and bending (212) the component to meet the design. Still additional fabricating steps may include collecting (214) the components and storing (216) the components for delivery. Once fabricated, the several components may be delivered (218) to a facility construction site, arranged (220) in a lay down or onsite storage area, and later installed (222). At several points throughout the fabrication and installation process, the components may be scanned (224) by a reader or a scanner and information regarding the status of the component may be communicated to a computing device for further analysis or storage.

With respect to interpreting (202), the interpretation process may involve interpreting a design model including one or more systems for supporting building operations. The design model may be the starting point for the process. The model may be a data rich detailed representation design of a facility or product from which data may be extracted, processed, interpreted, identified, tracked, fabricated, delivered, installed, and tallied. This process may not be specific to any given project and may be used at a variety of locations and under a variety of circumstances.

As depicted in FIG. 2, the interpretation software or module may extract data from the design model. This data may be transformed into a usable identifiable language to be processed, identity coded, tracked, fabricated, delivered, installed, and tallied throughout this course of action. The software may extract the component data, such as pipe diameter, for example, the quantity of the components, the material type and determine whether it should be fabricated (bent, cut, or otherwise modified) or if it is a unmodified component, such as a straight section of pipe, for example. The software or module may designate the components into standard sizes or lengths, such as standard pipe lengths, for example.

As shown in FIG. 3, the interpretation software or module may access and extract and input data from the design model database, translating the data into a usable process form, and storing the data in a separate file database to be used in several processes throughout this operation, In the embodiment shown, the interpretation process may extract several items of pipe data from the model database. For example, the interpretation software or module may extract the system type (302), the material type (304), and the material size (306). The process may break down each pipe run into standard lengths of pipe and extract the bending angles and number of bends in each section, the distance between the bends in each section while incorporating the pipe gain and the take up for each bend. The process may formulate and assign an identifiable code for tracking the alpha numeric code to each pipe length. The identifiable code may be scanned and tracked at various stages throughout the process. Upon installation and tracked as complete, the interpretation software database may input the material identified as completed data back into the model and compare the data to the overall model to obtain a percentage of completion.

In some embodiments, the system type (302) may reflect the type of service it is providing. For example, the system type (302) may be designated as P for power, L for lighting, D for data, FA for fire alarm, SO for sound, SC for security, SY for system, and LV for low voltage. Other naming conventions and nomenclatures may also be used and may be adapted for the particular discipline being supported. That is, for example, in the case of HVAC systems, H may designate heating ducts, while AC may designate air conditioning ducts. In other HVAC cases, S may designate supply and R may designate return.

The material type (304) may reflect the material the particular components are made of. For example, the material may be designated as GRC for Rigid metal conduit, EMT for Electrical metallic tubing, or IMC for Intermediate metal conduit. Other naming conventions and nomenclatures may also be used and may be adapted for the particular discipline being supported. For example, in the case of HVAC systems, duct work may be designated as G for galvanized ductwork or I for insulated ductwork or other designations may be used.

The material size (306) may reflect the cross-sectional dimensions of the components. For example, in the case of pipes, the pipe size may be designated as 0.5 for ½" diameter pipe, 0.75 for ¾" diameter pipe, 1 for 1" diameter, 1.25 for 1¼" diameter, 1.5 for 1½" diameter, 2 for 2" diameter, 2.5 for 2½" diameter, 3 for 3" diameter, 3.5 for 3½" diameter, 4 for 4" diameter, 5 for 5" diameter, 6 for 6" diameter, etc. In other examples, such as rectangular HVAC ductwork, for example, the material size may be designated as 12×24 or 16×25, for example, indicating that the ductwork has a cross-section with a 12" by 24" rectangle or a 16" by 25" rectangle, respectively.

The degree or angle of bend (212) may be between 0 degrees and 90 degrees and may be designated as a numeric value with two decimal places. For example five degrees may be designated as 5.00, twenty two and one half degrees may be designated as 22.50, fifty three and three quarter degrees may be designated as 53.75. Other ranges for degree of bend may be used depending on the application and other degrees of precision may also be used.

The length of a given component may be based on standard lengths common in a given industry. For example, in the electrical conduit industry, a length of pipe may be broken down into multiple standard lengths when the pipe length exceeds the standard length and/or listed as its finished length if it is less than a standard length when completed. For example a one hundred and twenty eight foot run of pipe may be broken down into twelve foot ten foot sections and one eight foot section of pipe. (Ten foot pipe lengths are standard pipe lengths in the electrical industry)

The distance between bends in the pipe run may incorporate formulas to factor in the pipe gain from each bend and the take up needed for each bend.

The identifiers later used by the tracking system may be developed as the interpretation module extracts data from the model. That is, the interpretation module may break up the several systems in the model and establish a list of components for each system. The identifiers may be alpha numeric codes that are be applied to each pipe length and they may be a compilation of the above-described data in an accumulative form. For example, the alpha numeric code may start with a seven digit number preceded by the abbreviation produced by the material type designation and succeeded by a dash and a three digit number for each length in the run. The seven digit identifiable code may increase by an additional factor for each non connected pipe run. A pipe run may be defined as a string of pipes connected to each other.

In one embodiment, a system of identifiers may be described for two power pipe runs that are 40 feet long running parallel to two data pipe runs that are also 40 foot long. The first component of the first power pipe may be coded as P-0001001-001, the second component of the first power pipe may be coded as P-0001001-002, the third component of the first power pipe may be coded as P-0001001-003, and the fourth component of the first power pipe would be coded as P-0001001-004. The first component of the first data pipe may be coded as D-0001001-001, the second component of the first data pipe may be coded as D-0001001-002, the third component of the first data pipe may be coded as D-0001001-003, and the fourth component of the first data pipe may be coded as D-0001001-004. The first component of the second power pipe may be coded as P-0001002-001, the second component of the second power pipe may be coded as P-0001002-002, the third component of the second power pipe may be coded as P-0001002-003, and the fourth component of the second power pipe may be coded as P-0001002-004. The first component of the second data pipe may be coded as D-0001002-001, the second component of the second data pipe may be coded as D-0001002-002, the third component of the second data pipe may be coded as D-0001002-003, and the fourth component of the second data pipe may be coded as D-0001002-004, and so on. Other identifier protocols or nomenclatures may also be used.

Figure 4:
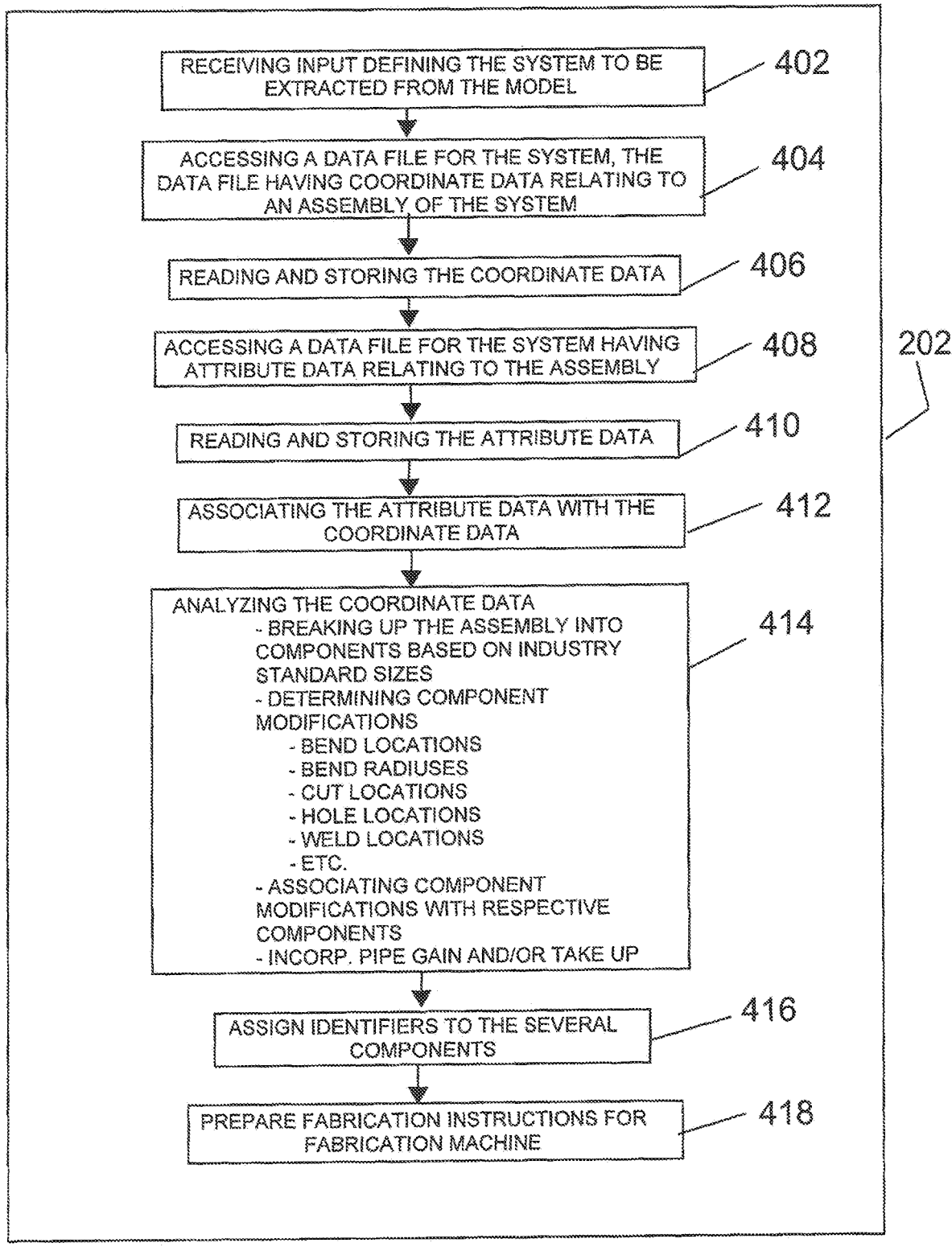
FIG. 4 is a flow chart of a portion of the method of FIGS. 2 and 3.

Referring to FIG. 4, a more detailed discussion of the operations performed by the interpretation module relating to mining data from the BIM model may be provided. As shown, the interpretation module may receive input defining the system to be extracted from the model (402). For example, a user may request the data relating to the electrical system and more particularly, the power services for the facility. In other embodiments, the interpretation module may be configured to automatically mine data relating all of the systems or the systems of particular disciplines, such as the electrical systems or the mechanical systems, for example. Where the interpretation module is pre-configured for mining a particular type of data, the input operation may be omitted.

The interpretation module may access a data file for the selected system (404). The present data file may include coordinate data relating to one or more assemblies of the selected system. The interpretation module may read and store the coordinate data from the data file (406).

The interpretation module may also access another data file for the selected system (408). The present data file may include attribute data relating to the assembly. In some cases, depending on the organization of the modeling software, the coordinate data file and the attribute data file may be the same file. The interpretation module may read and store the attribute data from the data file (410) and the interpretation module may associate the attribute data with the coordinate data (412). In some cases, the association of the data may occur naturally due to associations existing in the modeling software.

The interpretation module may analyze the data (414) by breaking up the assembly or assemblies into components based on industry standard or selected sizes. Once broken up, the attribute data may be used to determine modifications for each of the components. That is, for example, where an assembly includes a bend, the bend location and radius, for example, may be determined. Other modifications may also be provided including cutting, hole drilling, welding, and the like. The modifications may then be associated with suitable components of the assembly. For example, if the assembly included a 90 degree bend 45 feet from its start point, then the broken up assembly may include 4 straight pieces of pipe, while the fifth piece of pipe, for example, may have a 90 degree bend in it at the 5 foot mark. In addition, provisions for pipe gain and take up may also be provided to assure suitable lengths of pipe are provided and fit with the intentions of the design model.

The several components of the assembly may be assigned an identifier (416). As described above, this may include assigning a system of alpha numeric labels to each of the components of an assembly. The interpretation module may then prepare fabrication instructions for a fabrication machine (418). This portion of the operations may include step by step instructions in machine formatted code for bending a pipe at a particular point and providing a particular radius, for example. In some embodiments, these instructions may include instructions to feed the pipe into the machine a particular distance, for example, and then actuate bending elements or devices to create a bend at a particular point along the length of the pipe.

With respect to selecting a raw material (204), as shown in both of FIGS. 2 and 3, a robotic and/or manual pipe selector 114 may be used. The selector 114 may receive input data from the interpretation software, process the data, and select the appropriate system component made of the appropriate material and having the appropriate size to be processed. The pipe selector 114 may process this data, and select the appropriate type of material and size of material to be further processed. That is, based on the material type (i.e., GRC for Rigid metal conduit, EMT for Electrical metallic tubing, IMC for Intermediate metal conduit), the selector may travel, move, or otherwise access the an area where the selected material type is stored. The pipe selector may then select the appropriate pipe size based on the material size from the data provided by the interpretation process. The material size may be designated as 0.5 for ½" pipe, 0.75 for ¾", 1 for 1", 1.25 for 1¼", 1.5 for 1½", 2 for 2", 2.5 for 2½", 3 for 3", 3.5 for 3½", 4 for 4", 5 for 5", 6 for 6", etc. The pipe selector 114 may then deliver the appropriate type and size of material to the identification coding area 116, for example, as shown in FIGS. 2 and 3.

With respect providing an identifier (206), as shown in both of FIGS. 2 and 3, each component may be identified with a code. Providing an identifier may include laser etching, affixing a label, or otherwise associating an identifier with a component of the system. The identifiers used for association may be input from the interpretation module. The identifying equipment 116 may code each piece of material with a unique identification code that will be used throughout this process, product tracking, product installation and verification of material completion. As discussed above, the equipment 116 that is used to perform this process could be a bar coding machine, a laser engraving machine, or a labeling machine. Other equipment 116 may also be provided.

With respect to the conveying operation (208), as shown in both of FIGS. 2 and 3 and also is depicted in FIG. 1, the conveyor system 118 may transport the material from the identification coding stage 116 to the bending stage 122 or to the transportation stage 124 either manually and/or mechanically based on the input from the interpretation software and identification code. Pipe lengths designated as straight may be conveyed directly to the transportation bin 124, while pipe lengths whose identifiers are associated with attributes such as a bend or series of bends will be diverted to the bender process.

With respect to the sorting operation (210), a gate or other device for diverting the flow of components may be used to suitably direct the components. In some embodiments, for example, the sorting operation may include scanning the component with a reader 119 and communicating the component identifier to the computing device 110 and awaiting a response. The computing device 110 may receive the communication from the reader 119 or scanner and review the details of the part that was scanned. Where the part requires further fabrication, the sorter 120 may direct the component for further fabrication. Where the part does not require further fabrication, the sorter may direct the component to the collection area for collection by the collector 124. In still other embodiments, rather than scanning the component and communicating it to the computing device 110 for analysis, the reader 119 may have a storage medium and a processor for determining the direction of a component. In still other embodiments, the system may be programmed ahead of time and sequenced to fabricate components on an ongoing basis. In this embodiment, the sorter 120 may, instead, direct the component based on its order in a stream of components. It is noted that while the sorting operation (210) has been described as relating to whether a component needs to be bent or not and relating to only one decision throughout the process, those of skill in the art will understand and appreciate that several sorters 120 may be used to control the flow of components to one or a plurality of further or alternative fabrication devices. That is, for example, in addition to bending or in lieu of bending, a raw material may be cut to length and a sorter 120 may be used to direct particular components to a cutter.

Figure 5:
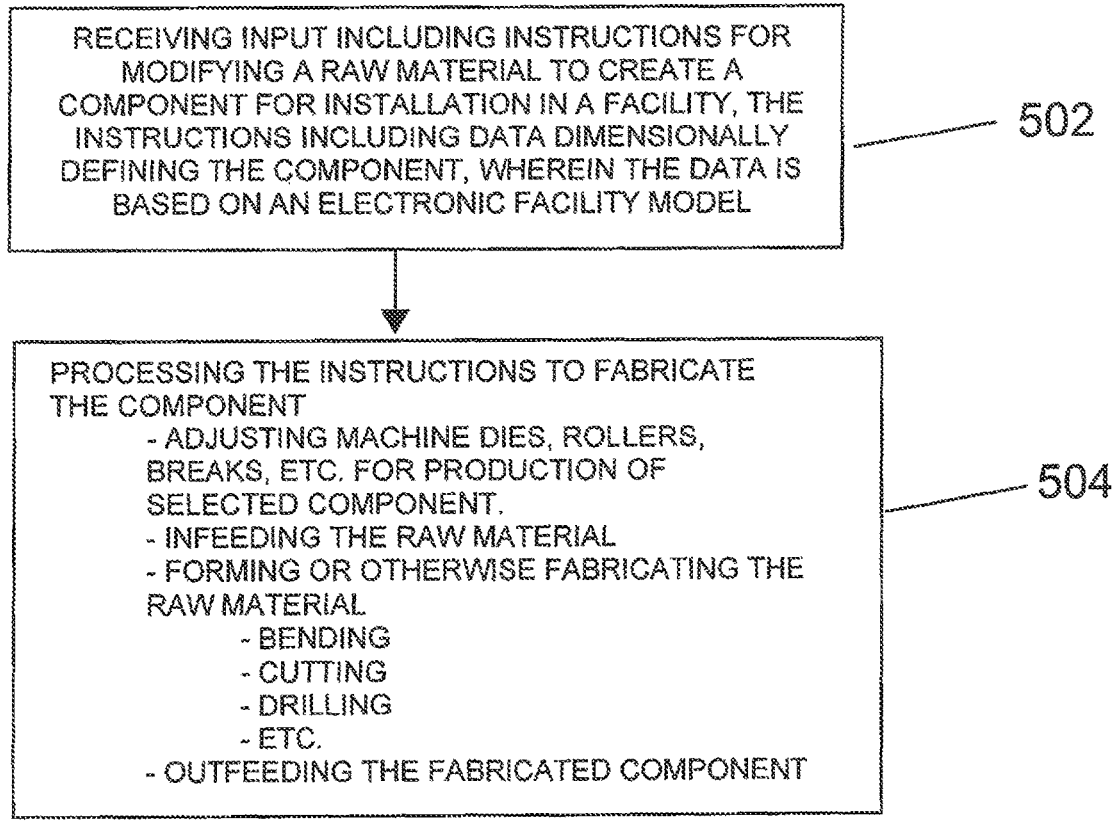
FIG. 5 is a flow chart of a portion of the method of FIGS. 2 and 3.

With respect to bending (212), a component may be fed into a component configuration device 122 and formed. As shown in FIG. 5, the method may include receiving or accessing data relating to the size of the component, the radius of the bend, and the location of the bend or bends. The device may then adjust any dies, rollers, breaks or other features to accommodate the component. The device 122 may then receive the component from the conveyor 118 or other feeding apparatus and may roll, break, or otherwise bend the component. In some embodiments, the data may be input into a CNC machine for example, and the component may be bent according to the instructions and dimensions provided to the machine. In some embodiments, a manual bender may be used. The equipment 122 will execute bends based on the input and/or information from the interpretation software. This can be either a single pipe bend and/or multiple pipe bends in each length of pipe. Following the bending stage 122 the pipe may be transported to the transport bin 124 and tracked at that point by the identification code. Other processes may also be performed on the way to the transport bin 124.

With respect to collecting (214), the components may be directed from the one or more devices used to form or finish the components to a collector or bin 124. The collecting may thus include conveying the components to a collection area and placing the components in a collection device or bin 124. The collecting operation (214) may also include providing an identifier on the collection device or bin in which the fabricated components are placed. The collection (214) of the components may include grouping several related components together. For example, in the case of electrical conduit, a particular run of pipe may include several components and each of the components in the run may be collected and placed in a common bin. Other grouping approaches may be used and multiple bins may be used where a particular group does not fit within the bin, for example.

The transportation bin 124 may be loaded with material and an identification code for product tracking in the same manner previously described in the material identification coding section may be provided on the bin. As before, the code may include a barcode, a laser engraving, a label or other identifying device or system.

With respect to storing (216) the components, a yard 126 or internal storage area may be used until a project site is ready to receive components or until a sufficient number of bins 124 are populated for efficient shipping to the project site. The bin 124 may be placed in or conveyed to a storing area (216) and the bin may be scanned (224) or the components in a bin may be scanned (224) as being stored there. The scanner 128 may transmit this information to the computing device 110 to update the status of the respective components as fabricated and stored, for example.

With respect to delivery (218), loaded bins 124 may be tracked by their identification code and loaded onto the delivery truck and delivered to the installation site 142. The bins 124 or components in the bins 124 may be scanned (224) as they are loaded onto a truck, for example, and the scanner 128 may communicate with a computing device 110 to update the component status as shipped.

Upon arriving at the project site 142, the bin 124 may be unloaded, scanned (224) by a site scanner 134 and signed for. The scanner 134 may communicate with the computing device 110 via local network connection or a WiFi, cellular, or other wireless connection 140. The bin 124 may be transported to an installation area (220) and further scanned (224) and signed for by the foreman where the components in the bin 124 may be unloaded. The scanner 134 may communicate to the computing device 110 that the components of a bin 124 are in a lay down area 132, for example, awaiting installation. The bin 124 may then be sent back to the pre-assembly facility 108 to be re-assigned and reused. The components may then be installed (222) and scanned (224) once installed. The scanner 134 may then communicate back to the computing device 110 that the scanned components are installed.

Regarding the model comparison (226), the model may be updated with the information regarding the material designated as installed from the interpretation and tracking software as either complete or incomplete. The completed items may be compared and calculated with the overall quantity of items in the model to provide an accurate percentage of completion of the total project model.

That is, upon installation of the material and it being registered as complete, the interpretation software database may input the material identified as completed data back into the model and compare the installed portions of the model to the overall model to obtain a percentage of completion. The model comparison may be a continual process throughout the duration of the project until the completion percentage reaches one hundred percent complete.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. An automated method of preparing fabrication instructions for electrical conduit in a building, the method comprising:
    receiving geometry data defining at least a portion of an electrical conduit system for a facility, the electrical conduit system including a pipe run with a pipe bend;
    dividing the pipe run into segments including a bent pipe segment having the pipe bend, wherein dividing the pipe run into segments is based on a selected or standard pipe length, a selected end of the pipe run, and effects of the pipe bend in the pipe run, wherein effects of the pipe bend include:
    a location of the pipe bend; and
    effects of at least one of gain, shrink, and take-up for the pipe bend in the pipe run; and
    preparing fabrication data useable via a fabrication portion to fabricate the bent pipe segment and including a pipe size and a bend location defining a location of the pipe bend relative to the end of the bent pipe segment.

2. The method of claim 1, wherein the pipe bend comprises a plurality of bends in the pipe run.

3. The method of claim 2, wherein the fabrication data comprises a distance between each of the plurality of bends.

4. The method of claim 3, wherein the fabrication data comprises a degree of bend for each of the plurality of bends.

5. The method of claim 4, wherein the fabrication data comprises a radius for each of the plurality of bends.

6. The method of claim 2, wherein the fabrication data comprises a radius for each of the plurality of bends.

7. The method of claim 1, wherein the fabrication data comprises a degree of bend for the bend in the bent pipe segment.

8. The method of claim 1, wherein a selected end of the pipe run comprises the starting end of the pipe run.

9. A system for fabricating electrical conduit, comprising:
a computing system configured for preparing fabrication instructions for the electrical conduit, the computing system being configured to:
receive geometry data defining an electrical conduit system for a facility, the electrical conduit system including a pipe run with a pipe bend;
divide the pipe run into segments including a bent pipe segment having the pipe bend, wherein the computing system bases decisions about dividing the pipe run into segments on a selected or standard pipe length, a selected end of the pipe run, and effects of the pipe bend in the pipe run, wherein effects of the pipe bend include:
a location of the pipe bend; and
effects of at least one of gain, shrink, and take-up for the pipe bend in the pipe run; and
prepare fabrication data useable via a fabrication portion to fabricate the bent pipe segment and including a pipe size and a bend location defining a location of the pipe bend relative to the end of the segment; and
a fabrication portion configured to receive the fabrication data and fabricate the bent pipe segment.

10. The system of claim 9, wherein the fabrication portion comprises an automated pipe bending machine configured to fabricate the bent pipe segment including multiple bends throughout the length of the bent pipe segment.

11. The method of claim 9, wherein the pipe bend comprises a plurality of bends in the pipe run.

12. The method of claim 11, wherein the fabrication data comprises a distance between each of the plurality of bends.

13. The method of claim 12, wherein the fabrication data comprises a degree of bend for each of the plurality of bends.

14. The method of claim 13, wherein the fabrication data comprises a radius for each of the plurality of bends.

15. The method of claim 11, wherein the fabrication data comprises a radius for each of the plurality of bends.

16. The method of claim 9, wherein the fabrication data comprises a degree of bend for the pipe bend in the bent pipe segment.

17. The method of claim 9, wherein a selected end of the pipe run comprises the starting end of the pipe run.

18. The method of claim 17, wherein the fabrication data includes a type comprising at least one of power, lighting, and data.

19. An electrical conduit fabrication machine configured for fabricating a selected bent pipe segment of an electrical conduit pipe run for a facility, the selected bent pipe segment comprising multiple bends at particular positions along a length of the selected bent pipe segment where each bend of the multiple bends has a particular bend radius and degree of bend and is located at a particular position along the selected bent pipe segment, the selected bent pipe segment being particularly shaped and sized for forming a portion of the electrical conduit pipe run, the machine comprising:
a receiving element configured for receiving fabrication data for fabricating the selected bent pipe segment and including information for creating each of the multiple bends, the fabrication data being based on a selected or standard pipe length, a selected end of the pipe run, a length of the pipe run, and effects of the multiple bends in the pipe run, wherein effects of the multiple bends include:
locations of the multiple bends; and
effects of at least one of gain, shrink, and take-up for the multiple bends in the pipe run;
a processor for processing the fabrication data to operate the machine and fabricate the selected bent pipe segment including formation of the multiple bends along the length of the selected bent pipe segment;
a receiving portion configured for receiving a pipe; and
a fabrication portion configured for fabricating the pipe according to the fabrication data including bending the pipe to include the multiple bends and to create the selected bent pipe segment, the fabrication portion comprising a bending portion adjustable to a bend radius and configured to bend the pipe to a respective bend radius for each of the multiple bends in the selected bent pipe segment.

20. The machine of claim 19, wherein the fabrication data further comprises a distance between the multiple bends of the selected bent pipe segment.

21. The machine of claim 19, wherein the fabrication data further comprises an orientation of each of the multiple bends of the selected bent pipe segment.

* * * * *